Sept. 9, 1958     R. N. BULAND     2,851,661

FREQUENCY ANALYSIS SYSTEM

Filed Dec. 6, 1955

INVENTOR.
ROBERT N. BULAND
BY
*F. J. Schmitt*
*George J. Rubens*
ATTORNEYS

United States Patent Office 2,851,661
Patented Sept. 9, 1958

2,851,661

FREQUENCY ANALYSIS SYSTEM

Robert N. Buland, Camarillo, Calif.

Application December 6, 1955, Serial No. 551,479

6 Claims. (Cl. 324—77)

(Granted under Title 35, U. S. Code (1952), sec. 266)

The invention described herein may be manufactured and used by or for the Government of the United States of America for governmental purposes without the payment of any royalties thereon or therefor.

The present invention relates to a new and novel frequency analysis system and more particularly to such a system employing a plurality of so-called "open ended" filters having different breakpoint frequencies, the output of successive filters being subtracted from one another to obtain information as to the amount of power in particular frequency bands.

In modern technology, it is often necessary to measure the frequency spectral characteristics of complex structures at very low frequencies on the order of one hundredth of a cycle per second. For example, many types of automatic control systems employed in guided missiles are seriously affected by random noise at extremely low frequencies, and the measurement of such frequencies presents a unique problem which cannot be satisfactorily solved with conventional frequency analysis circuits.

A first method which has been developed to successfully measure the spectral characteristics at very low frequencies is the so-called Fourier series analysis or autocorrelation and Fourier transformation, by digital computer process. This method is extremely time consuming and requires that the original signal be transformed to digital form before an analysis can be made.

A second method for analyzing such low frequencies involves time base changing whereby tape recorder techniques are used to shift the low frequency spectrum into the audio range. This second method is also unsatisfactory since it requires complex circuitry to effect the time base change and at least one transfer of data to prepare the noise data for analysis.

Each of the aforementioned methods of low frequency spectrum analysis has proved unsatisfactory for the foregoing reasons and accordingly another approach has been to design circuits which will give immediate results, which is extremely desirable in research development. Such prior art systems have employed band-pass filters wherein each of the frequency bands which it is desired to investigate is passed by a single band-pass filter. Such systems have proved inadequate since band-pass filters exhibit transient characteristics which may last for an appreciable length of time. These transient characteristics obscure the noise being analyzed and accordingly introduce substantial errors in these systems to such an extent that the accuracy thereof is not satisfactory for analysis of frequencies as low as one-hundredth of a cycle per second.

The present invention employs so called "open ended" filters. The term "open ended" as used in the specification and claims of this case is intended to be a generic term which denotes either a conventional high-pass or a conventional low-pass filter. In other words, the term "open ended" signifies that the filter rejects all frequencies on one side of its breakpoint frequency and accepts or passes all frequencies on the other side of its breakpoint frequency.

For the purpose of illustration in the following description, high-pass filters are utilized. As is well known, such high-pass filters have a certain critical breakpoint frequency below which all frequencies are rejected and above which all frequencies are passed.

Open ended filters are far superior to bandpass filters in their transient characteristics, and accordingly errors produced by such characteristics are greatly reduced in the invention system as compared to prior art systems. In order to enable the utilization of such open ended filters, a novel circuit is provided wherein the output of a high-pass filter with a relatively high frequency breakpoint is subtracted from the output of a high-pass filter with a breakpoint of lower frequency. This subtraction gives spectral information in the frequency band under study, and as many frequency bands as desired may be studied by providing a sufficient number of filters with varying breakpoint frequencies. Prior to subtraction, the outputs of the filters are squared and integrated whereby the output of the system measures power which is the quantity desired.

An object of the present invention is to provide a new and novel frequency analysis system wherein the error introduced by the transient characteristic of such a system is reduced to a minimum.

Another object is to provide a system which minimizes additional transfer of data and computations by an operator.

A further object is to provide a frequency analysis system which is efficient and reliable in operation, yet simple and inexpensive in construction.

Other objects and many of the attendant advantages of this invention will be readily appreciated as the same becomes better understood by reference to the following detailed description when considered in connection with the accompanying drawings wherein:

Fig. 3 illustrates a preferred arrangement for indicating the value of the respective signals obtained from the system of Fig. 1.

Figure 1:
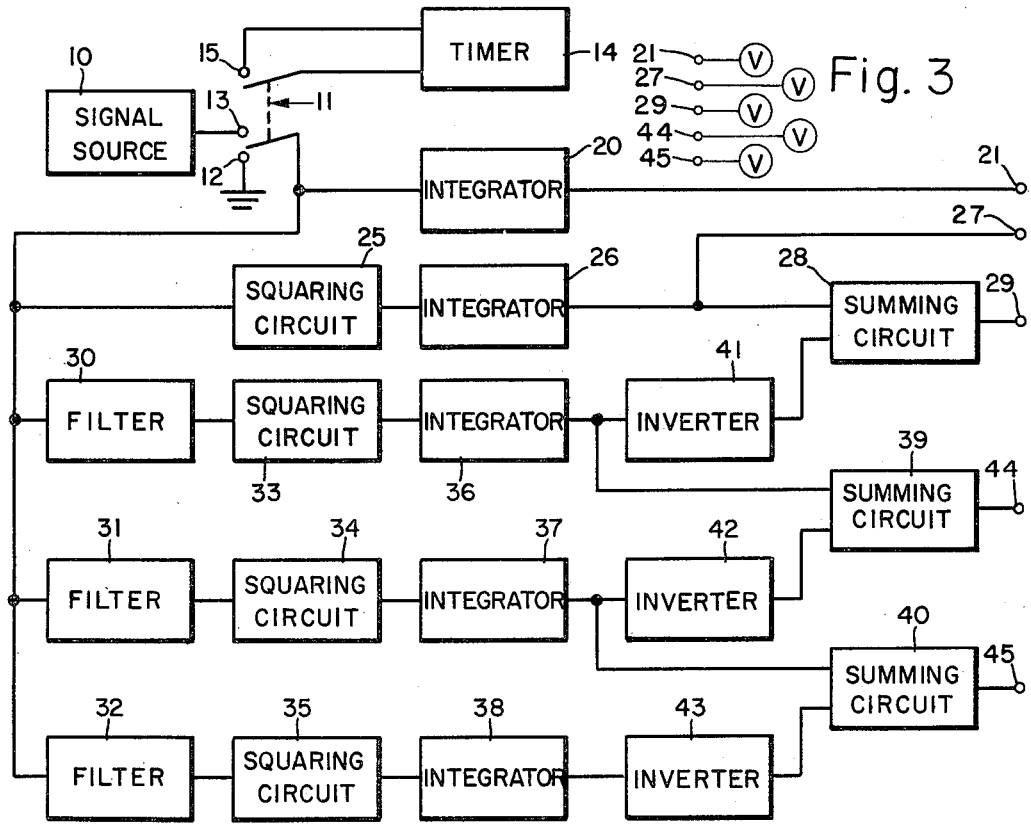
Fig. 1 is a block diagram of the invention system.

Referring now to Fig. 1, there is shown a source of signals 10 which may comprise any type of random noise signal which it is desired to analyze. A conventional double pole switch indicated generally by numeral 11 is provided for connecting the invention system to ground at terminal 12 or to the source of signals at terminal 13, and simultaneously closing a circuit through timer 14 when the switch engages terminal 15. Timer 14 consists of a conventional clock mechanism and it is apparent that the timer will be started upon closing of switch 11 and energization of the system, and the timer will subsequently be stopped when the switch is opened and the invention system is de-energized.

Figure 2:
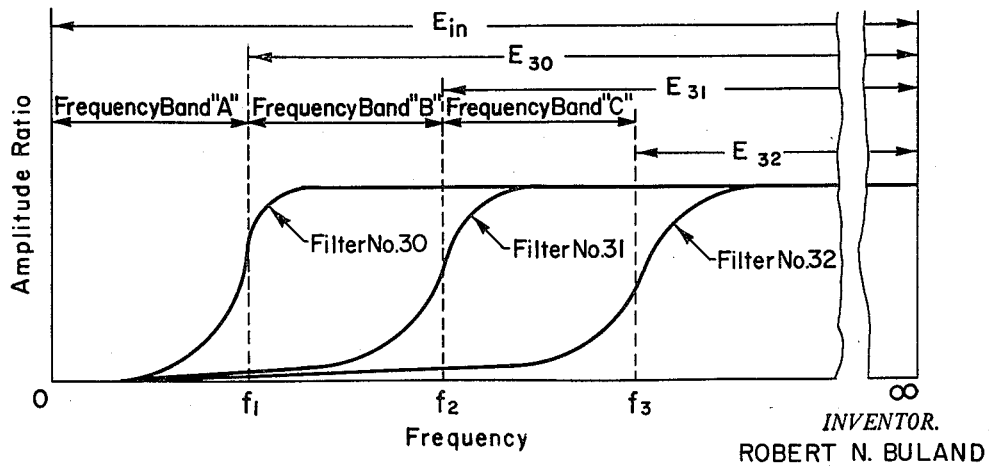
Fig. 2 is a graph illustrating the filter characteristics wherein frequency is plotted vs. amplitude ratio.

The input signal is fed directly into a conventional integrator circuit 20 such as shown for example in Fig. 2.4, page 78 of the text entitled "Analogue Methods in Computation and Simulation," by Walter Soroka, McGraw-Hill Book Company, Inc., 1954. The output of integrator 20 is connected to a terminal 21 at which point the output voltage thereof may be measured by a voltmeter as shown in Fig. 3 for a purpose hereinafter described.

The input signal is also fed directly into a conventional squaring circuit 25 as shown for example in Fig. 2.27, page 66 of the text entitled "Analogue Methods in Computation and Simulation," by Walter Soroka, McGraw-Hill Book Company, Inc., 1954. Squaring circuit 25 operates in a conventional manner to provide an output voltage which is a square function of the input voltage thereto. The output of circuit 25 is connected to the input of an integrator 26 similar to integrator 20 and the output of integrator 26 is connected to a terminal 27 at which point the voltage may be measured by the voltmeter of Fig. 3 for a purpose hereinafter described. The output of integrator 26 is also connected to one of the input leads of a conventional summing circuit 28 as shown for example in Fig. 2.3, page 46 of the text entitled "Analogue Methods in Computation and Simulation," by Walter Soroka, McGraw-Hill Book Company, Inc., 1954, the output of summing circuit 28 being connected to a terminal 29, where the voltage may be measured by suitable means such as the voltmeter of Fig. 3.

As mentioned previously, high-pass filters are disclosed for the purpose of illustration, and the resolution of the low-frequency noise spectrum is dependent on the number of high-pass filters utilized. Three filters are illustrated, and accordingly a three band spectrum analysis of the input signal is derived from such an arrangement. It is evident that any number of filters and the components associated therewith may be utilized as desired.

The input signal is also fed directly into three parallel connected high-pass filters 30, 31, and 32 each of which has a different breakpoint frequency. As may be seen in Fig. 2, filter 30 has the lowest breakpoint frequency $f_1$, filter 31 has a higher breakpoint frequency $f_2$, and filter 32 has the highest breakpoint frequency $f_3$ of the three filters. It is evident that each of the filters rejects substantially all frequencies below its breakpoint frequency and passes substantially all frequencies above its breakpoint frequency. It should be noted that due to the characteristics of the filters, some undesired signals are passed below the breakpoint frequency and some of the desired frequencies are not passed above the breakpoint frequency, but these errors tend to cancel each other out thereby giving satisfactory accuracy to the system.

The output signals from each of filters 30, 31, and 32 are fed to the inputs of squaring circuits 33, 34, and 35 respectively, which are similar to squaring circuit 25. The output signal of each of squaring circuits 33, 34, and 35 is fed to the input of integrators 36, 37 and 38 respectively, which are similar to integrator 26. The output signals of integrators 36 and 37 are fed directly to one of the input leads of summing circuits 39 and 40 respectively. The output signals of integrators 36, 37, and 38 are also fed into inverters 41, 42, and 43 respectively, each of the inverters comprising, for example, a conventional amplifier which changes the polarity of the output signal of the associated integrator. The output signals of each of inverters 41, 42, and 43 are each fed into another input lead of summing circuits 28, 39, and 40 respectively. The output of each of summing circuits 39 and 40 is connected to terminals 44 and 45 respectively from which suitable means such as the conventional voltmeters of Fig. 3 may be connected for providing the desired readings.

The operation of the system is as follows:

Switch 11 is first actuated such that it engages terminal 12 and grounds the system thereby preparing the system for operation. The switch is then closed such that it engages terminals 13 and 15 whereby the signal to be analyzed will be fed into the system and the timer will simultaneously be actuated.

The input signal is integrated by integrator 20 and the output of the integrator appearing at terminal 21 may be defined mathematically as $\int_0^T E_{in} dt$, where $E_{in}$ is the input voltage, and this mathematical quantity when divided by the time of the integration is the mean of the input signal or the D. C. present in the signal. This mean value may be utilized in conventional calculations which may be made in the complete analysis of the frequency spectrum.

The input signal $E_{in}$ is squared by squaring circuit 25, and accordingly the output of circuit 25 is defined mathematically as $E_{in}^2$ which is then integrated by integrator 26. The output of integrator 26 which appears at terminal 27 may be mathematically defined as $\int_0^T E_{in}^2 dt$ which is the root mean square voltage or the total energy in the signal. This quantity is also useful in analyzing the frequency spectrum.

The output of filter 30, designated $E_{30}$ in Fig. 2 is squared and integrated by circuits 33 and 36 such that the output of integrator 36 may be mathematically defined as $\int_0^T E_{30}^2 dt$. In a similar manner the output signals $E_{31}$ and $E_{32}$ of filters 31 and 33 respectively, are squared and integrated whereby the output of integrator 37 may be mathematically defined as $\int_0^T E_{31}^2 dt$, and the output signal of integrator 38 may be mathematically defined as $\int_0^T E_{32}^2 dt$.

Referring now more particularly to Fig. 2, it is apparent that the power contained in frequency band A defined between zero and $f_1$ may be obtained by subtracting the power passed by filter 30 from the total power in the input signal. The power contained in frequency band "B" likewise may be obtained by subtracting the amount of power passed by filter 31 from the amount of power passed by filter 30; and in a similar manner the amount of power in frequency band "C" defined between frequencies $f_2$ and $f_3$ may be obtained by subtracting the power passed by filter 32 from the power passed by filter 31.

In order to subtract the power passed by filter 30 from the total power in the input signal, inverter 41 changes the polarity of the output signal of integrator 36 and the resultant output signal from inverter 41 is combined with the output signal from integrator 36 in summing circuit 28 in accordance with well known computer techniques such as that the signal appearing at terminal 29 represents the output signal of integrator 26 minus the output signal of integrator 36.

In a like manner, the output signals of integrators 37 and 38 are changed in polarity by inverters 42 and 43 respectively and are fed to summing circuits 39 and 40 such that the signal appearing at terminal 44 represents the output signal of integrator 36 minus the output signal of integrator 37, and the output signal appearing at terminal 45 represents the output signal of integrator 37 minus the output signal of integrator 38.

From the foregoing, it is apparent that the output signal at terminals 29, 44, and 45 represents the energy in frequency bands "A," "B," and "C," respectively, as represented mathematically in the following equations:

Energy in band $A = \int_0^T E_{in}^2 dt - \int_0^T E_{30}^2 dt$
Energy in band $B = \int_0^T E_{30}^2 dt - \int_0^T E_{31}^2 dt$
Energy in band $C = \int_0^T E_{31}^2 dt - \int_0^T E_{32}^2 dt$ The power in each of the foregoing frequency bands may be obtained merely by dividing by the amount of time during which the signal was fed into the system, this quantity being obtained from timer 14. It is evident that when the desired signal has been fed into the system, switch 11 is opened, the input signal being interrupted and the timer being simultaneously de-energized.

In order to compute power, it is necessary to square the signal in each case and the squaring circuits may be greatly simplified, if desired, by first converting the dual polarity input signal to a single polarity signal. This may be accomplished by inserting an additional rectifier means in the system such that the input signal passes through the rectifiers prior to entering the squaring circuits 25, 33, 34, and 35. This would necessitate the utilization of four additional rectifier components which would add slightly to the complexity of the system, but would simplify the construction of the squaring circuits.

In the foregoing description, high-pass filters have been utilized for the purpose of description, but it should be noted that low-pass filters may also be utilized if desired. If low-pass filters are utilized, the arrangement shown in Fig. 1 would be modified such that filter 30 would have the highest breakpoint frequency, filter 31 a lower breakpoint frequency, and filter 32 the lowest breakpoint frequency. In this case the output at terminal 29 would represent the energy in the highest frequency band, and the output of integrator 38 would represent the energy in the lowest frequency band.

It is evident that there is provided a new and novel frequency analysis system wherein the error introduced by the transient characteristics of the system and the additional transfer of data and computations by an operator are reduced to a minimum. The device is efficient and reliable in operation, yet simple and inexpensive in construction.

Obviously many modifications and variations of the present invention are possible in the light of the above teachings. It is therefore to be understood that within the scope of the appended claims the invention may be practiced otherwise than as specifically described.

I claim:

1. A frequency analysis system which comprises an open ended filter adapted to be connected to a source of signals to be analyzed, first squaring means for squaring the output signal of said source, second squaring means for squaring the output signal of said filter, first integrating means for integrating the output signal of said first squaring means, second integrating means for integrating the output signal of said second squaring means, inverting means for changing the polarity of the output signal of said second integrating means, means for summing the output signals of said inverting means and said first integrating means, and indicator means connected to the said summing means to denote the value of the summed output signals of said inverting means and said first integrating means.

2. A system as defined in claim 1 including means for integrating the output signal of said source.

3. A system as defined in claim 2 including a timing means and switch means for simultaneously connecting said system to a source of signals to be analyzed and actuating said timing means.

4. A frequency analysis system which comprises a plurality of open ended filters adapted to be connected to a source of signals to be analyzed, each of said filters having a different break frequency, first squaring means for squaring the output signal of said source, a plurality of second squaring means for squaring the output signal of each of said filters, first integrating means for integrating the output signal of said first squaring means, a plurality of second integrating means for integrating the output signals of each of said second squaring means, a plurality of inverting means each of which changes the polarity of the output signal of one of said integrating means, a plurality of summing means each of which sums the output signals of one of said inverting means and another of said integrating means, and a plurality of indicators respectively connected to said plurality of summing means, each of said indicators respectively denoting the summed output signals of one of said inverting means and another one of said integrating means.

5. A system as defined in claim 4 including means for integrating the output signal of said source, timing means, and switch means for simultaneously connecting said system to a source of signals to be analyzed and actuating said timing means.

6. A system as defined in claim 5 including a first rectifier means adapted to be connected to said source, the output of said first rectifier means being connected to the input of said first squaring means, a plurality of second rectifier means each of which has the input thereof connected to the output of one of said filters, the output of each of said second rectifier means being connected to the input of one of said second plurality of squaring means.

References Cited in the file of this patent

UNITED STATES PATENTS

| 2,499,953 | Herzog | Mar. 7, 1950 |
| 2,716,733 | Roark | Aug. 30, 1955 |

FOREIGN PATENTS

| 597,531 | Great Britain | Jan. 28, 1948 |